(12) United States Patent
Shoham et al.

(10) Patent No.: US 11,029,253 B2
(45) Date of Patent: Jun. 8, 2021

(54) COMPUTERIZED METHOD FOR CONFIGURING AN INSPECTION SYSTEM, COMPUTER PROGRAM PRODUCT AND AN INSPECTION SYSTEM

(71) Applicant: APPLIED MATERIALS ISRAEL LTD., Rehovot (IL)

(72) Inventors: Amir Shoham, Haifa (IL); Ido Dolev, Rehovot (IL); Yariv Simovitch, Rehovot (IL)

(73) Assignee: APPLIED MATERIALS ISRAEL LTD., Rehovot (IL)

(*) Notice: Subject to any disclaimer, the term of this patent is extended or adjusted under 35 U.S.C. 154(b) by 185 days.

(21) Appl. No.: 15/474,210

(22) Filed: Mar. 30, 2017

(65) Prior Publication Data

US 2018/0284031 A1 Oct. 4, 2018

(51) Int. Cl.
*G01N 21/21* (2006.01)
*G01N 21/88* (2006.01)
(Continued)

(52) U.S. Cl.
CPC ..... *G01N 21/8806* (2013.01); *G01N 21/8851* (2013.01); *G01N 21/956* (2013.01); *G06T 7/0004* (2013.01); *G01N 2021/8848* (2013.01); *G01N 2021/8887* (2013.01); *G01N 2021/95676* (2013.01); *G06T 2207/10152* (2013.01); *G06T 2207/30148* (2013.01)

(58) Field of Classification Search
CPC .......... G01N 21/8806; G01N 21/8851; G01N 21/956; G01N 2021/8848; G01N 2021/8887; G01N 2021/95676; G06T 7/0004; G06T 2207/20021; G06T 2207/30148; G06T 2207/30201

See application file for complete search history.

(56) References Cited

U.S. PATENT DOCUMENTS 10,228,331 B2   3/2019  Liu et al.
2005/0264813 A1* 12/2005  Giakos ............... B82Y 20/00
                                                  356/369

(Continued)

*Primary Examiner* — Patrick E Demosky
(74) *Attorney, Agent, or Firm* — Kilpatrick Townsend & Stockton LLP

(57) ABSTRACT

A computer program product, a computerized method for configuring an inspection system and an inspection system. The inspection system may include an image acquisition module that comprises illumination optics and collection optics, a controller; and a processor. The image acquisition module may be arranged to acquire a group of first images of an object segment. Different first images of the group of first images are acquired while the inspection system is configured with different polarization configurations that belong to a first group of polarization configurations. The processor may be arranged to determine polarization parameters of different points within the object segment; wherein the determining is based on the group of first images and the different polarization configurations and calculate, based on the polarization parameters of the different points, a group of second images of the object segment that would be acquired when the inspection system is configured according to different polarization configurations that belong to a second group of polarization configurations.

14 Claims, 7 Drawing Sheets

(51) Int. Cl.
    *G06T 7/00*     (2017.01)
    *G01N 21/956*     (2006.01)

(56) References Cited

U.S. PATENT DOCUMENTS

| | | | |
|---|---|---|---|
| 2011/0311126 A1* | 12/2011 | Sakai | G01N 21/47 382/149 |
| 2012/0092484 A1* | 4/2012 | Taniguchi | G01N 21/9501 348/87 |
| 2012/0323356 A1* | 12/2012 | Dziura | G01N 21/4788 700/121 |
| 2015/0356726 A1* | 12/2015 | Fukazawa | G01N 21/956 382/149 |
| 2016/0261852 A1* | 9/2016 | Hirasawa | G01C 11/30 |
| 2017/0276613 A1* | 9/2017 | Liu | G01N 21/21 |

* cited by examiner

COMPUTERIZED METHOD FOR CONFIGURING AN INSPECTION SYSTEM, COMPUTER PROGRAM PRODUCT AND AN INSPECTION SYSTEM

BACKGROUND OF THE INVENTION

An inspection system may be required to inspect objects (such as semiconductor wafers or lithographic masks) that include multiple object segments.

Each object segment may include microscopic structural elements of different shapes and materials.

Different microscopic structural elements may differ from each other by their polarization parameters.

The inspection system may have configurable polarization parameters. Each polarization parameter can have multiple different values.

There is a growing need to provide a fast and a reliable method for determining optimal or sub-optimal values of the polarization parameters of the inspection system. When inspecting a segment, the optimal or sub-optimal values of the polarization parameters may match the polarization parameters of the object segment.

SUMMARY

According to an embodiment of the invention there may be provided a computer program product, a computerized method for configuring an inspection system and an inspection system.

BRIEF DESCRIPTION OF THE DRAWINGS

The subject matter regarded as the invention is particularly pointed out and distinctly claimed in the concluding portion of the specification. The invention, however, both as to organization and method of step, together with objects, features, and advantages thereof, may best be understood by reference to the following detailed description when read with the accompanying drawings in which:

Figure 1:
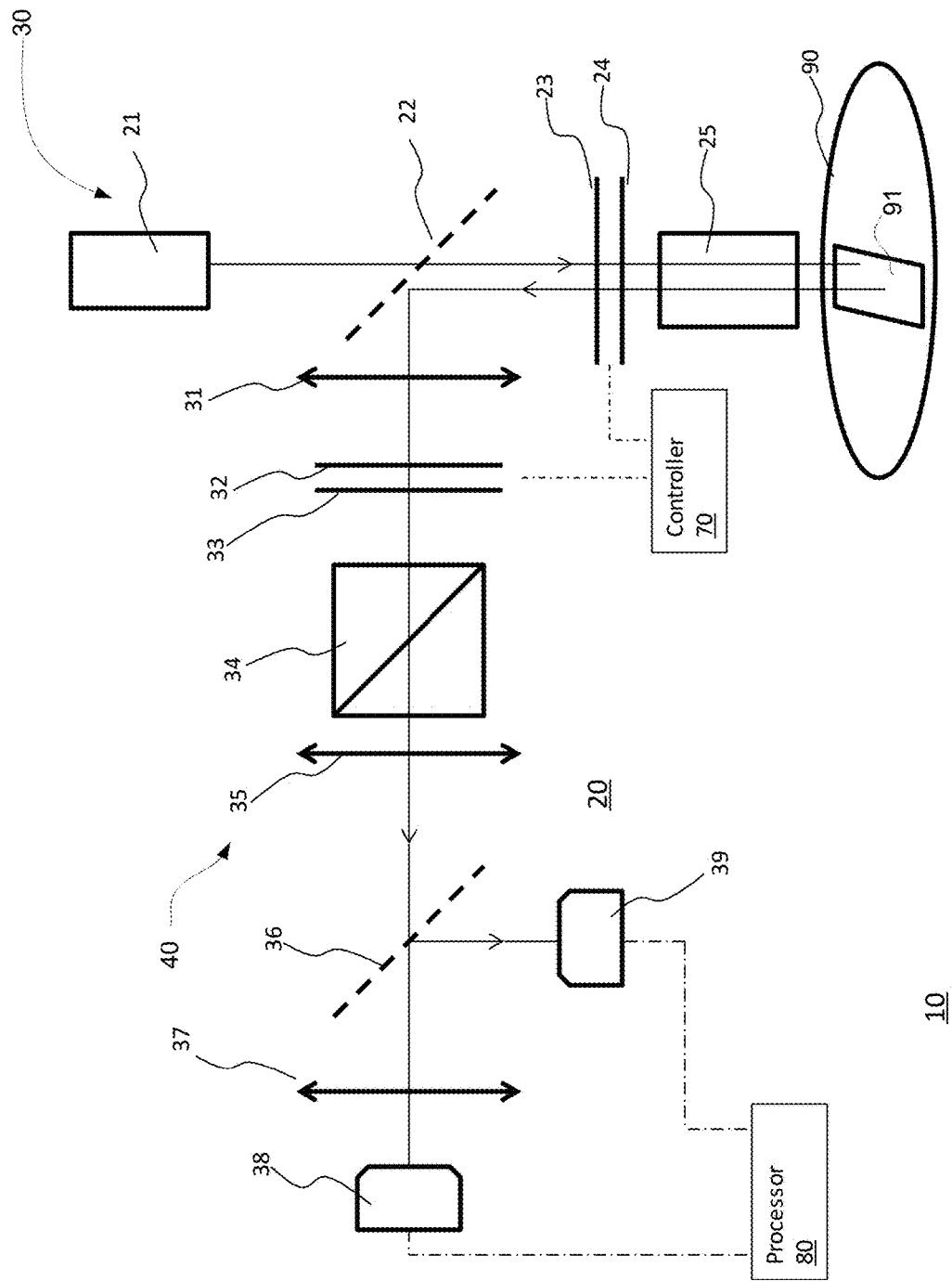
FIG. 1 illustrates an example of an inspection system and an object.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

FIG. 1 is an example of inspection system 10 and object 90.

Object 90 include multiple object segments such as object segment 91. The object segment may be of any shape and size. Inspection system 10 may inspect one object segment after the other.

Inspection system 10 includes image acquisition module 20, controller 70 and processor 80.

Image acquisition module 20 includes illumination optics 30 and collection optics 40.

FIG. 1 illustrates illumination optics 30 as illuminating object segment 91 with electromagnetic radiation.

Illumination optics 30 may be configured to various illumination polarization states.

An illumination polarization state may represent the polarization parameters of various components of illumination optics 30—such as but not limited to retarders, waveplates, and polarizing beam splitter. Non-limiting examples of waveplates include a half-wave plate and a quarter-wave plate.

Collection optics 40 is arranged to collect collected electromagnetic radiation from the segment of the object.

Collection optics 40 may include one or more sensors for sensing the collected electromagnetic radiation.

Collection optics 40 may be configured to various collection polarization states.

A collection polarization state may represent the polarization parameters of various components of collection optics 40—such as but not limited to retarders, waveplates, and polarizing beam splitter.

Illumination optics 30 and collection optics 40 may share one or more optical component. FIG. 1 illustrates illumination optics 30 and collection optics 40 that share first beam splitter 22, first quarter-wave plate 23, first half-wave plate 24 and telescope objective lens 25.

Alternatively—illumination optics 30 and collection optics 40 do not share any optical components.

The image acquisition module 20 is arranged to acquire a group of first images of an object segment.

Different first images of the group of first images are acquired while the inspection system is configured with different polarization configurations that belong to a first group of polarization configurations.

Processor 80 is arranged to:
a. Determine polarization parameters of different points within the object segment. The determining is based on the group of first images and the different polarization configurations.
b. Calculate, based on the polarization parameters of the different points, a group of second images of the object segment that would be acquired when the inspection system is configured according to different polarization configurations that belong to a second group of polarization configurations. The number of different polarization configurations of the second group of polarization configurations is at least one fifty times bigger than the number of different polarization configurations included in the first group of polarization configurations. It should be noted that calculating a very large number of second images, based on a much smaller number of first images enables the inspection system to evaluate a very large number of polarization configurations without actually configuring the inspection system to the very large number of possible polarization configurations—which is not feasible. The very large number may exceed one hundred thousand.
c. Compute a second image attribute for each second image of multiple second images of the group of second images thereby providing multiple second image attributes.
d. Select, out of the group of second images, a selected second image based on at least some of the multiple second image attributes.

Controller 70 is arranged to configure the inspection system according to a polarization configuration that is associated with the selected second image.

In FIG. 1 the image acquisition module 20 is illustrated as including light source 21, first beam splitter 22, first quarter-wave plate 23, first half-wave plate 24, telescope objective lens 25, first collection lenses 31, second quarter-wave plate 32, second half-wave plate 33, polarizer 34, second beam splitter 36, third collection lenses 37, first detector 38, and second detector 39.

Illumination optics 30 includes first beam splitter 22, first quarter-wave plate 23, first half-wave plate 24 and telescope objective lens 25.

Electromagnetic radiation from the light source 21 passes through illumination optics 30 and impinges on object segment 91.

Collected electromagnetic radiation from object segment 91 passes through the collection optics 40.

Collected radiation from the object segment (a) passes through telescope objective lens 25, first half-wave plate 24, first quarter-wave plate 23, (b) is deflected by the first beam splitter 22 towards first collection lenses 31, (c) passes through first collection lenses 31, second quarter-wave plate 32, second half-wave plate 33, polarizer 34, second collection lenses 35, (d) is split by second beam splitter 36, (e) a portion of the collected radiation passes through third collection lenses 37 and impinges on first detector 38 while another portion of the collected radiation is deflected by second beam splitter 36 to be detected by second detector 39.

First detector 38 is positioned in an image plane while second detector 39 is positioned at a pupil plane.

The collection polarization state of collection optics 40 may represent the polarization parameters of first half-wave plate 24, first quarter-wave plate 23, second quarter-wave plate 32, second half-wave plate 33 and polarizer 34.

The illumination polarization state of illumination optics 30 may represent the polarization parameters of first half-wave plate 24 and first quarter-wave plate 23.

Controller 70 may control the configuration of the inspection system by controlling the polarizations of the first half-wave plate 24, first quarter-wave plate 23, second quarter-wave plate 32, second half-wave plate 33 and polarizer 34.

Processor 80 may receive and process detection signals from first detector 38 and from second detector 39.

Figure 2:
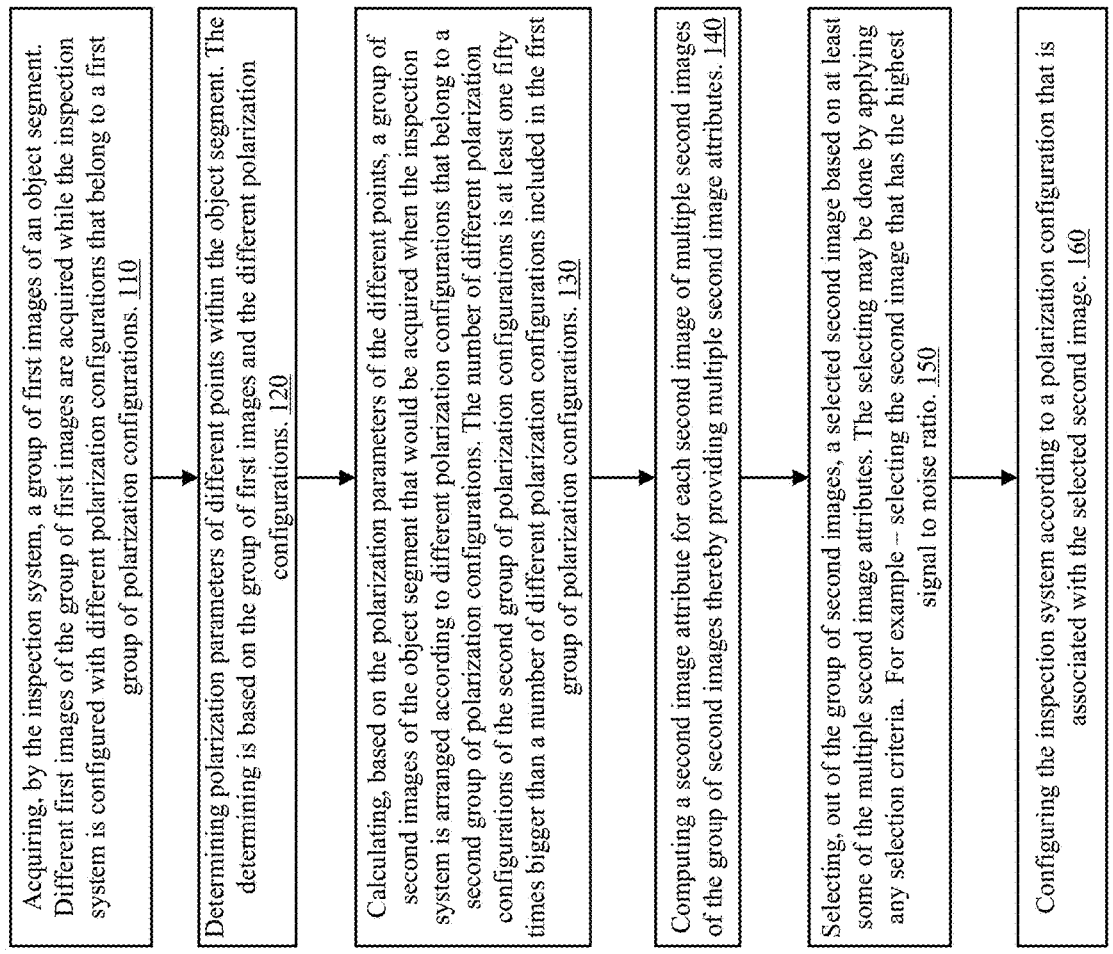
FIG. 2 illustrates an example of a method.

FIG. 2 illustrates an example of method 100.

Method 100 may include:
a. Acquiring (110), by the inspection system, a group of first images of an object segment. Different first images of the group of first images are acquired while the inspection system is configured with different polarization configurations that belong to a first group of polarization configurations. The acquiring of the group of first images includes multiple repetitions of (a) changing the polarization configuration of the inspection system to a new polarization configuration of the first group of polarization configurations, and (b) acquiring a new first image of the object segment.
b. Determining (120) polarization parameters of different points within the object segment. The determining is based on the group of first images and the different polarization configurations.
c. Calculating (130), based on the polarization parameters of the different points, a group of second images of the object segment that would be acquired when the inspection system is configured according to different polarization configurations that belong to a second group of polarization configurations. The number of different polarization configurations of the second group of polarization configurations is at least one fifty times bigger than a number of different polarization configurations included in the first group of polarization configurations.
d. Computing (140) a second image attribute for each second image of multiple second images of the group of second images thereby providing multiple second image attributes. The second image attribute may be a signal to noise ration or any other attribute that may assist in selecting a second image that will result in improved polarization configuration of the inspection system. The improved polarization configuration may provide the best fit to the polarization parameters of the points of the object segment.

e. Selecting (150), out of the group of second images, a selected second image based on at least some of the multiple second image attributes. The selecting may be done by applying any selection criteria. For example—selecting the second image that has the highest signal to noise ratio.

f. Configuring (160) the inspection system according to a polarization configuration that is associated with the selected second image.

The following example will further clarify method 100. This following example is based on the following set of assumptions:

a. The group of first images include twenty-five first images that are acquired by using twenty-five polarization configurations.

b. The twenty-five polarization configurations were provided by using combinations of (i) five different first illumination polarization states and (ii) five different first collection polarization states.

c. The object segment corresponds to a field of view of the image acquisition module and each first image includes ten thousand pixels that are arranged in one hundred rows of one hundred pixels.

d. The different points are all the points of the object segment.

e. The polarization parameters of each point are represented by a Muller matrix that includes sixteen coefficients.

f. The group of second images include ninety-thousand second images that are calculated when assuming that the inspection system is configured to ninety-thousand different polarization configurations.

g. The ninety-thousand polarization configurations were provided by using combinations of (i) three hundred different second illumination polarization states and (ii) three-hundred different second collection polarization states.

Under the set of assumptions, the determining of polarization parameters of each point of the first image includes extracting the Muller matrix of a pixel that corresponds to the point from equation (1):

$$\begin{pmatrix} GL11 & \cdots & GL15 \\ \vdots & \ddots & \vdots \\ GL51 & \cdots & GL55 \end{pmatrix} = \begin{pmatrix} COLL1 \\ \vdots \\ COLL5 \end{pmatrix} \times \begin{pmatrix} M00 & \cdots & M03 \\ \vdots & \ddots & \vdots \\ M30 & \cdots & M33 \end{pmatrix} \times (ILL1 \ldots ILL5) \quad (1)$$

Wherein:
a. GL11 till GL55 are twenty-five gray level values of the pixel at each one of the twenty-five first images.
b. COLL1 till COLL5 represent the five different collection polarization states.
c. M00 till M33 are the sixteen coefficients of the Muller matrix of the point.
d. ILL1 till ILL5 represent the five different illumination polarization states.

GL11 till GL55, COLL1 till COLL5 and ILL1 till ILL5 are known in advance—and the Muller matrix can be computed using equation (1).

Equation (1) is an example of a determination of polarization parameters of a point that is based on (a) information about givens pixels from first images that are related to the given point, (b) information about the first collection polarization states, and information about the first illumination polarization states.

Especially—equation (1) illustrates a determination of polarization parameters of a point that includes comparing between (a) a matrix of givens pixels from first images that are related to the given point, (b) a product of multiplication between (i) a vector that represents the first collection polarization states, (ii) a Muller matrix of the given point, and (ii) a vector that represents the first illumination polarization states.

Under the set of assumptions, the calculating of the group of second images of the object segment may include solving equation (2):

$$\begin{pmatrix} COLL1 \\ \vdots \\ COLL300 \end{pmatrix} \times \begin{pmatrix} M(1,1) & \cdots & M(1,100) \\ \vdots & \ddots & \vdots \\ M(100,1) & \cdots & M(100,100) \end{pmatrix} \times (ILL1 \ldots ILL300) = \begin{pmatrix} IMAGE(1,1) & \cdots & IMAGEG(1,300) \\ \vdots & \ddots & \vdots \\ IMAGE(300,1) & \cdots & IMAGE(300,300) \end{pmatrix} \quad (2)$$

Wherein:
a. IMAGE(1,1) till IMAGE(300,300) are the ninety thousand second images.
b. COLL1 till COLL300 represent the three hundred different collection polarization states.
c. M(1,1) till M(100,100) are the ten thousand Muller matrices of the thousand pixels of the object segment.
d. ILL1 till ILL300 represent the three hundred different illumination polarization states.

Equation (2) is an example of a calculating of second images, based on the polarization parameters of the different points, wherein a calculation of the second images includes multiplying (i) a vector that represents the second collection polarization states, by (ii) Muller matrixes of the different points, and by (iii) a vector that represents the second illumination polarization states.

It should be noted that while equation (2) illustrates a massively parallel computation of the second images—the calculation of the second images may be at least partially serialized. For example—the second images can be computer by considering only some of the second illumination polarization states at a time.

It should be noted that:
a. The number of first images of the group of the first images may differ from twenty-five.
b. The number of different first illumination polarization states may differ from five.
c. The number of different first collection polarization states may differ from five.
d. The number of pixels per object segment may differ from ten thousand.
e. The object segment may not correspond to the field of view of the image acquisition module.
f. The different points of the object segment (for which the polarization parameters are calculated) may include only some of the points of the object segment.
g. The polarization parameters of a point may differ from a Muller matrix that includes sixteen coefficients.

h. The different first illumination polarization states and the different first collection polarization states may be represented in manners that differ from the vectors of equation (1).
i. Equation (1) is merely a non-limiting example of the calculation of the polarization parameter of the point.
j. The number of second images of the group of the second images may differ from ninety-thousand.
k. The number of different second illumination polarization states may differ from three hundred.
l. The number of different second collection polarization states may differ from three hundred.
m. The different second illumination polarization states and the different second collection polarization states may be represented in manners that differ from the vectors of equation (2).
n. Equation (2) is merely a non-limiting example of the calculation of the polarization parameter of the point.

Figure 3:
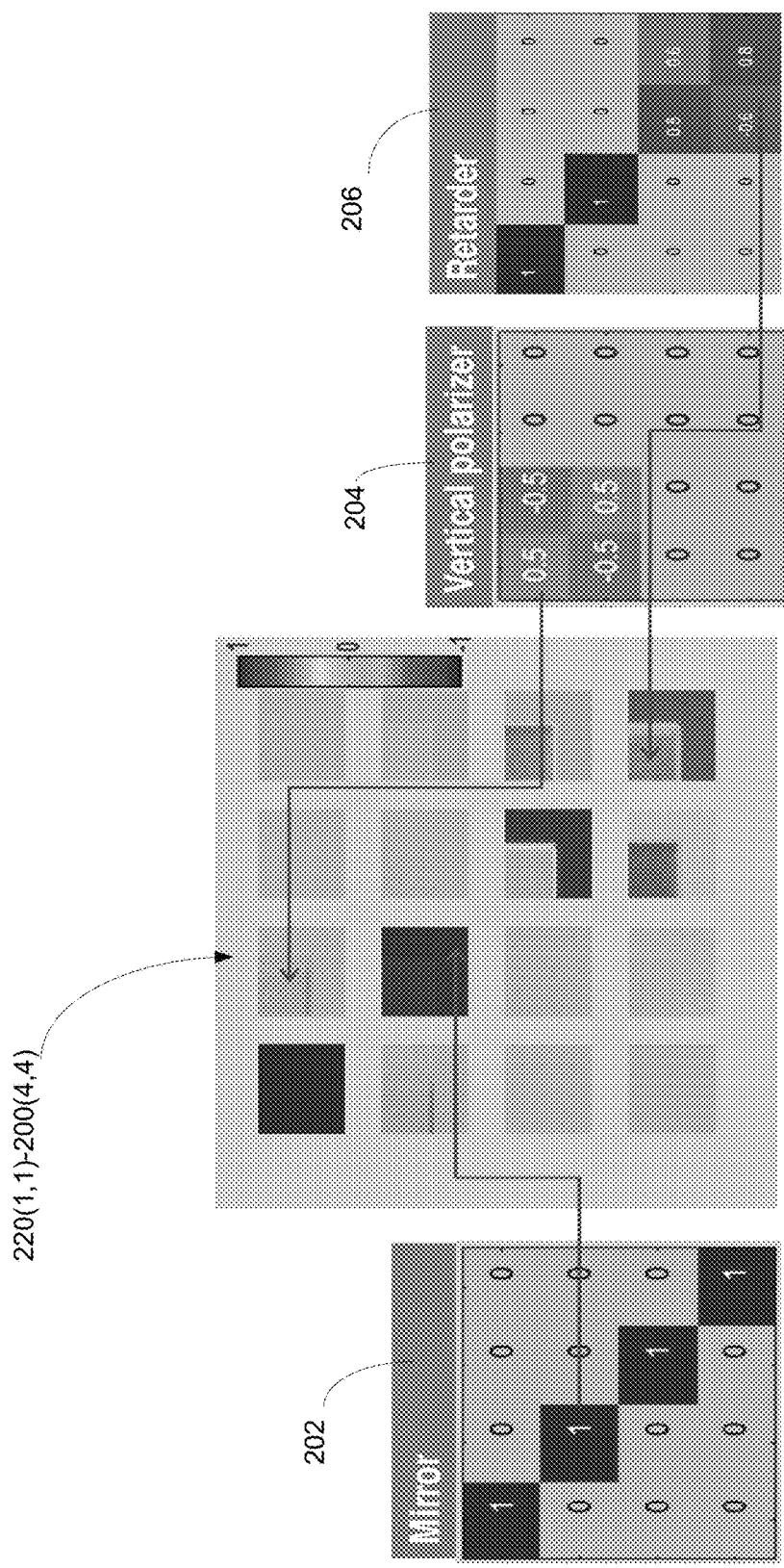
FIG. 3 illustrates an example of second images and Muller matrixes that represent different parts of the second images.

FIG. 3 illustrates second images 200(1,1)-200(4,4), and few Muller matrixes 202, 204 and 206 that represent different parts of the second images.

Figure 4:
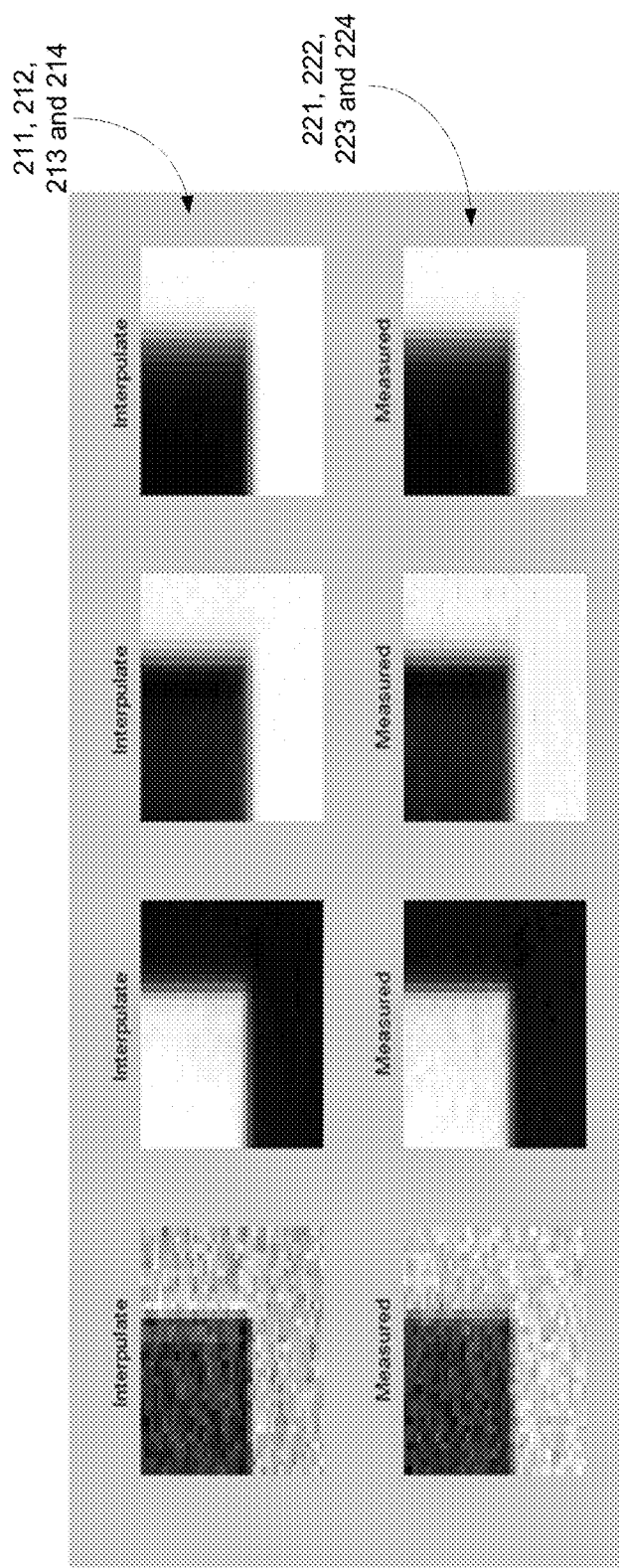
FIG. 4 illustrates an example of second images and first images.

FIG. 4 illustrates second images 211, 212, 213 214 and first images 221, 222, 223 and 224. Second images 211, 212, 213 214 were calculated using based on the polarization parameters of the different points in the images object segment and while assuming the same polarization configurations that were used to obtain the first images 221, 222, 223 and 224.

Figure 5:
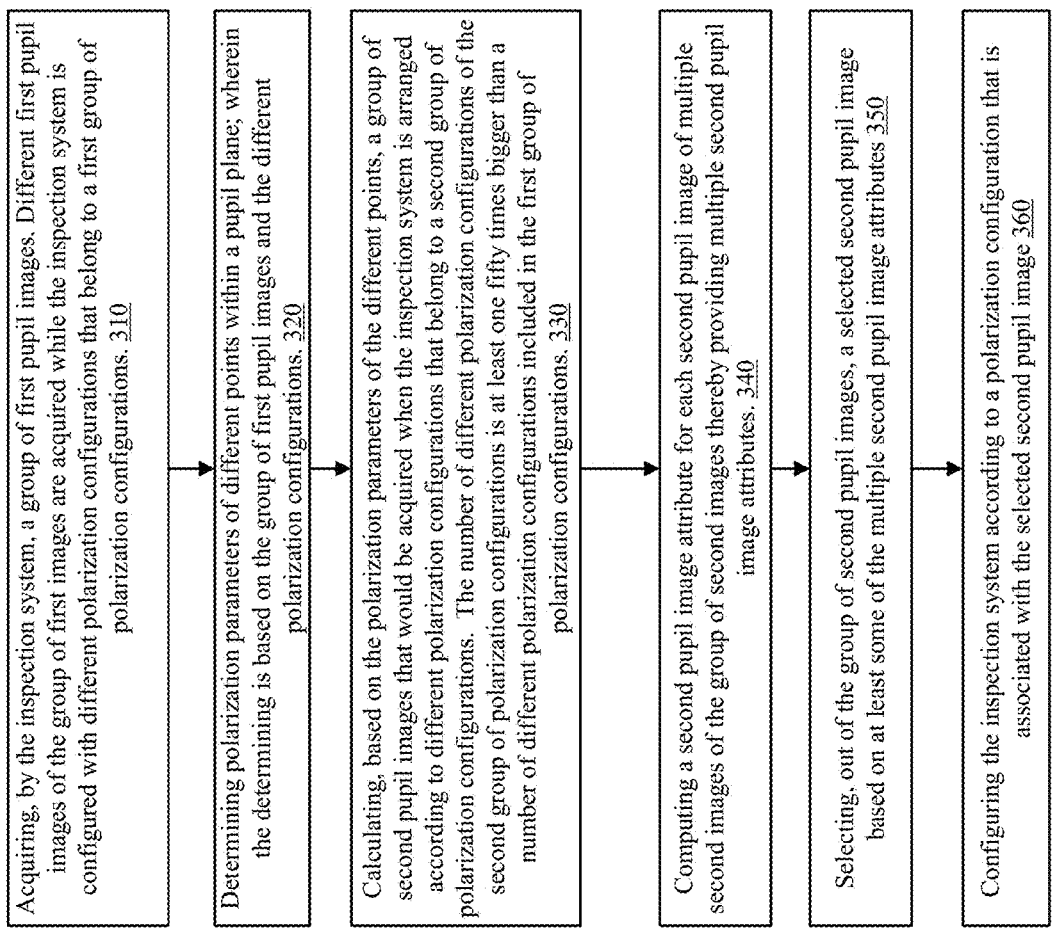
FIG. 5 illustrates an example of a method.

FIG. 5 illustrates an example of method 300.

Method 300 may include:
a. Acquiring (310), by the inspection system, a group of first pupil images. Different first pupil images of the group of first images are acquired while the inspection system is configured with different polarization configurations that belong to a first group of polarization configurations.
b. Determining (320) polarization parameters of different points within a pupil plane; wherein the determining is based on the group of first pupil images and the different polarization configurations;
c. Calculating (330), based on the polarization parameters of the different points, a group of second pupil images that would be acquired when the inspection system is configured according to different polarization configurations that belong to a second group of polarization configurations. A number of different polarization configurations of the second group of polarization configurations is at least one fifty times bigger than a number of different polarization configurations included in the first group of polarization configurations.
d. Computing (340) a second pupil image attribute for each second pupil image of multiple second images of the group of second images thereby providing multiple second pupil image attributes.
e. Selecting (350), out of the group of second pupil images, a selected second pupil image based on at least some of the multiple second pupil image attributes.
f. Configuring (360) the inspection system according to a polarization configuration that is associated with the selected second pupil image.

The acquiring of the group of first pupil images may include irradiating a mirror and detecting the first pupil images.

Figure 6:
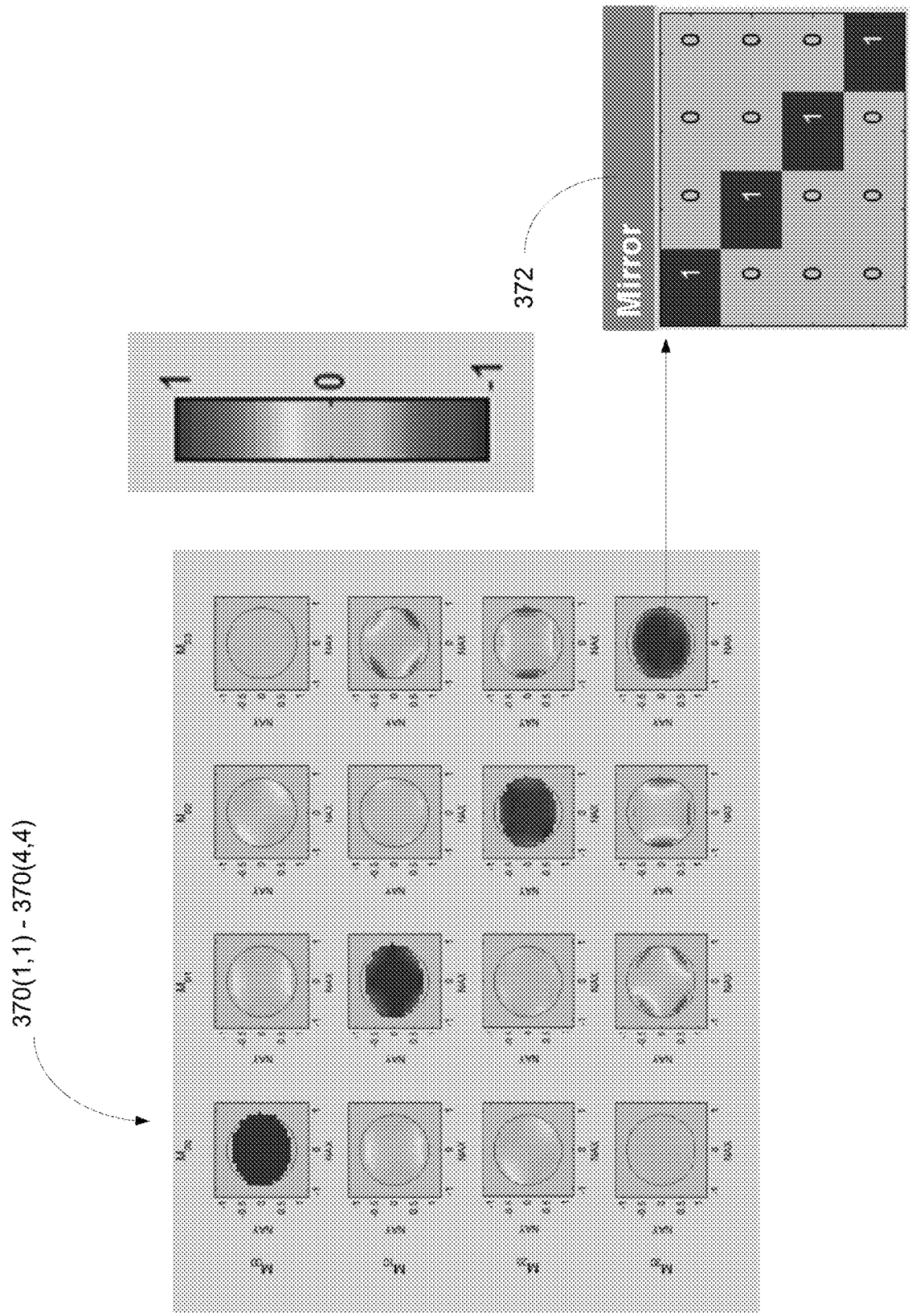
FIG. 6 illustrates an example of second pupil images and a Muller matrix of one of the parts of the second pupil images.

FIG. 6 illustrates second pupil images 370(1,1)-370(4,4) and a Muller matrix 372 of one of the parts of the second pupil images.

Figure 7:
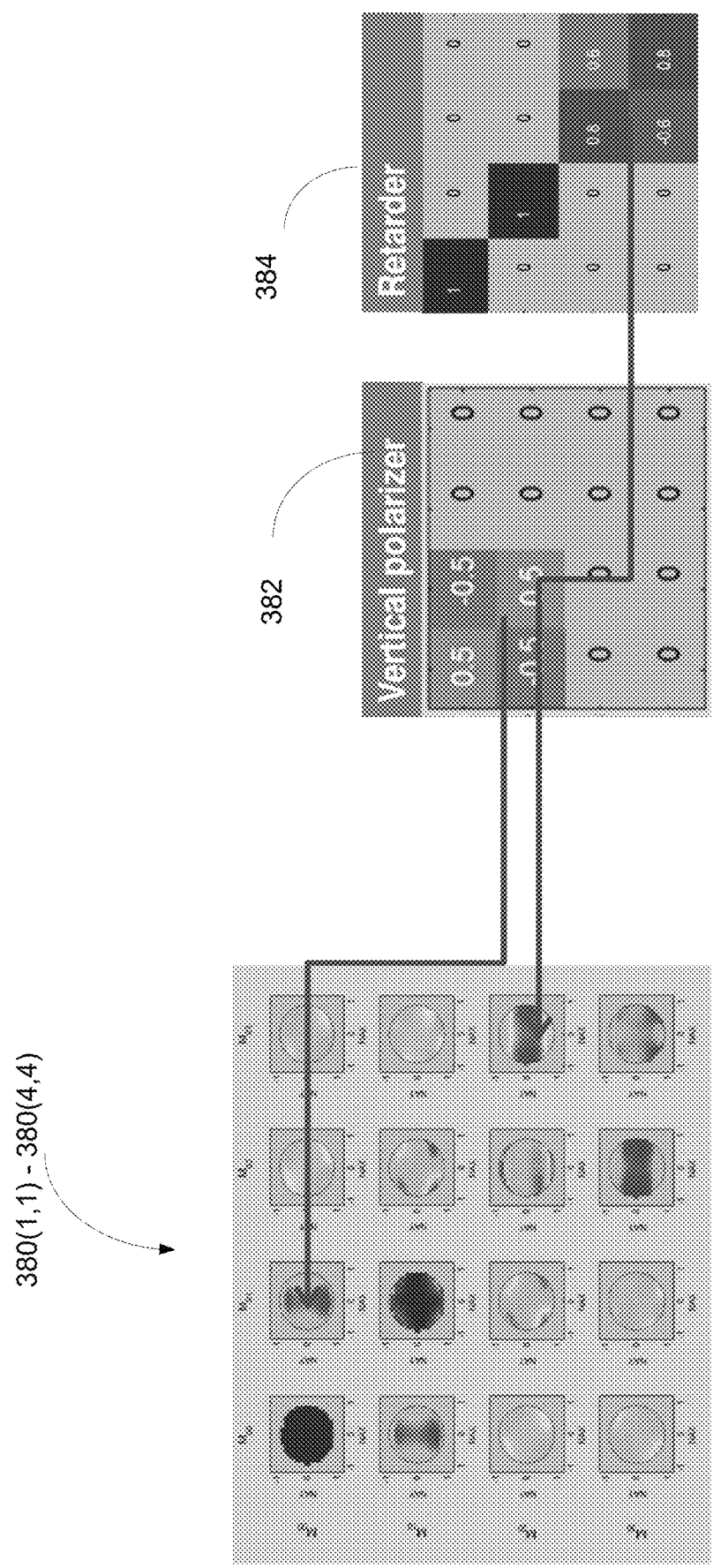
FIG. 7 illustrates an example of second pupil images and two Muller matrices of different parts of the second pupil images.

FIG. 7 illustrates second pupil images 380(1,1)-380(4,4) and two Muller matrices 382 and 384 of different parts of the second pupil images.

These images are obtained when illuminating a homogenous pattern such as a bare wafer.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of step in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described steps are merely illustrative. The multiple may be combined into a single step, a single step may be distributed in additional steps and steps may be executed at least partially overlapping in time. Moreover, alternative embodiments may include multiple instances of a particular step, and the order of steps may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. An inspection system that comprises:
an image acquisition module that comprises illumination optics and collection optics;
a polarization controller; and
a processor;
wherein the image acquisition module is arranged to acquire a group of first images, each image of the group of first images capturing a same portion of an object segment;
wherein different first images of the group of first images are acquired while the illumination optics and the collection optics are configured with different combinations of first illumination polarization states and first collection polarization states that belong to a first group of polarization configurations;
wherein the processor is arranged to:
determine a plurality of polarization parameters of each pixel in each image of the group of first images;
calculate, based on the plurality of polarization parameters, a group of second images of the object segment, wherein the group of second images represent a second group of polarization configurations comprising combinations of second illumination polarization states and second collection polarization states, wherein at least some of the second illumination polarization states are different from the first illumination polarization states, and wherein a number of different polarization configurations of the second group of polarization configurations is bigger than a number of different polarization configurations included in the first group of polarization configurations;
compute a second image attribute for each second image of the group of second images thereby providing multiple second image attributes; and
select, out of the group of second images, a selected second image based on at least some of the multiple second image attributes;
wherein the polarization controller is arranged to configure the inspection system according to a polarization configuration that is associated with the selected second image.

2. The inspection system according to claim 1 wherein the plurality of polarization parameters of each pixel in each image of the group of first images comprise a Muller matrix.

3. A computerized method for configuring an inspection system, the method comprises:
acquiring, by the inspection system, a group of first images, each image of the group of first images capturing a same portion of an object segment; wherein different first images of the group of first images are acquired while the inspection system is configured with different polarization configurations that belong to a first group of polarization configurations, the first group of polarization configurations including combinations of first illumination polarization states and first collection polarization states;
determining a plurality of polarization parameters of each pixel in each image of the group of first images;
calculating, based on the plurality of polarization parameters, a group of second images of the object segment, wherein the group of second images represent different polarization configurations that belong to a second group of polarization configurations, the second group of polarization configurations including combinations of second illumination polarization states and second collection polarization states, wherein at least some of the second group of polarization configurations are different from the first group of polarizations configurations, and at least some of the second illumination polarization states are different from the first illumination polarization states;
wherein a number of different polarization configurations of the second group of polarization configurations is bigger than a number of different polarization configurations included in the first group of polarization configurations;
computing a second image attribute for each second image of the group of second images thereby providing multiple second image attributes;
selecting, out of the group of second images, a selected second image based on at least some of the multiple second image attributes; and
configuring the inspection system according to a polarization configuration that is associated with the selected second image.

4. The computerized method according to claim 3 wherein the plurality of polarization parameters of each pixel in each image of the group of first images comprise a Muller matrix.

5. The computerized method according to claim 3 wherein the second image attribute is a signal to noise ratio of the second image.

6. The computerized method according to claim 3 wherein the different polarization configurations that belong to the first group of polarization configurations comprise different combinations of first illumination polarization states and of first collection polarization states.

7. The computerized method according to claim 6 wherein determining the plurality of polarization parameters of a given pixel comprises comparing between (a) a matrix of givens pixels from the group of first images, (b) a product of multiplication between (i) a vector that represents the first collection polarization states, (ii) a Muller matrix of the given pixel, and (ii) a vector that represents the first illumination polarization states.

8. The computerized method according to claim 6 wherein determining the plurality of polarization parameters of a given pixel is based on (a) information about givens pixels from the group of first images, (b) information about the first collection polarization states, and (c) information about the first illumination polarization states.

9. The computerized method according to claim 3 wherein the different polarization configurations that belong to the second group of polarization configurations comprise different combinations of second illumination polarization states and of second collection polarization states.

10. The computerized method according to claim 9 wherein calculating, based on the plurality of polarization parameters of different pixels of a given second image, comprises multiplying (i) a vector that represents the second collection polarization states, by (ii) Muller matrixes of the different pixels, and by (iii) a vector that represents the second illumination polarization states.

11. The computerized method according to claim 3 wherein the number of different polarization configurations of the second group of polarization configurations is at least one thousand times bigger than the number of different polarization configurations included in the first group of polarization configurations.

12. A non-transitory computer readable medium that stores instructions for:
  acquiring, by an inspection system, a group of first pupil images; wherein different first pupil images of the group of first pupil images are acquired while the inspection system is configured with different combinations of first illumination polarization states and first collection polarization states that belong to a first group of polarization configurations;
  determining a plurality of polarization parameters of each pixel in each image of the group of first pupil images;
  calculating, based on the plurality of polarization parameters, a group of second pupil images, wherein the group of second pupil images represent a second group of polarization configurations comprising combinations of second illumination polarization states and second collection polarization states, wherein at least some of the second illumination polarization states are different from the first illumination polarization states;
  wherein a number of different polarization configurations of the second group of polarization configurations is bigger than a number of different polarization configurations included in the first group of polarization configurations;
  computing a second pupil image attribute for each second pupil image of the group of second pupil images thereby providing multiple second pupil image attributes;
  selecting, out of the group of second pupil images, a selected second pupil image based on at least some of the multiple second pupil image attributes; and
  configuring the inspection system according to a polarization configuration that is associated with the selected second pupil image.

13. The non-transitory computer readable medium according to claim 12 that stores instructions for acquiring, by the inspection system, the group of first pupil images by irradiating a mirror.

14. The non-transitory computer readable medium according to claim 12 wherein the plurality of polarization parameters of each pixel in each image of the group of first pupil images comprise a Muller matrix.

* * * * *